United States Patent
Ding

(10) Patent No.: US 10,044,477 B2
(45) Date of Patent: Aug. 7, 2018

(54) METHOD AND BASE STATION FOR CSI PROCESS CONFIGURATION AND METHOD AND USER EQUIPMENT FOR CSI FEEDBACK

(71) Applicant: Sharp Kabushiki Kaisha, Osaka-shi, Osaka (JP)

(72) Inventor: Ming Ding, Shanghai (CN)

(73) Assignee: Sharp Kabushiki Kaisha, Sakai (JP)

(*) Notice: Subject to any disclaimer, the term of this patent is extended or adjusted under 35 U.S.C. 154(b) by 238 days.

(21) Appl. No.: 14/907,882

(22) PCT Filed: Aug. 4, 2014

(86) PCT No.: PCT/CN2014/083606
§ 371 (c)(1),
(2) Date: Jan. 27, 2016

(87) PCT Pub. No.: WO2015/014321
PCT Pub. Date: Feb. 5, 2015

(65) Prior Publication Data
US 2016/0173244 A1 Jun. 16, 2016

(30) Foreign Application Priority Data

Aug. 2, 2013 (CN) .......................... 2013 1 0333297

(51) Int. Cl.
*H04L 5/00* (2006.01)
*H04L 1/16* (2006.01)
(Continued)

(52) U.S. Cl.
CPC ......... *H04L 5/0023* (2013.01); *H04B 7/0469* (2013.01); *H04B 7/0478* (2013.01); *H04L 1/16* (2013.01); *H04L 5/0048* (2013.01)

(58) Field of Classification Search
None
See application file for complete search history.

(56) References Cited

U.S. PATENT DOCUMENTS

| 9,002,345 B2 * | 4/2015 | Lee | H04W 24/00 370/338 |
| 2013/0163461 A1 * | 6/2013 | Kim | H04B 7/0626 370/252 |

(Continued)

FOREIGN PATENT DOCUMENTS

CN 101848499 A 9/2010

OTHER PUBLICATIONS

Official Communication issued in International Patent Application No. PCT/CN2014/083606, dated Nov. 14, 2014.

(Continued)

*Primary Examiner* — Charles C Jiang
*Assistant Examiner* — George Atkins, Jr.
(74) *Attorney, Agent, or Firm* — Keating & Bennett, LLP

(57) ABSTRACT

The present disclosure provides a method in a base station for Channel State Information (CSI) process configuration and an associated base station. The method comprises: setting CSI process information for a User Equipment (UE) supporting three dimensional (3D) Multiple Input Multiple Output (MIMO), the CSI process information including at least an index of a CSI Reference Signal Resource (CSI-RS-R) for a vertical direction of a 3D MIMO antenna array; and transmitting the set CSI process information to the UE. Also disclosed are a method in a UE for CSI feedback and an associated UE. The method comprises: receiving CSI process information from a base station, the CSI process information including at least an index of a CSI Reference Signal Resource (CSI-RS-R) for a vertical direction of a three dimensional (3D) Multiple Input Multiple Output (MIMO) antenna array; measuring a CSI Reference Signal (CSI-RS) transmitted from the base station over the CSI-RS-R configured by the base station; and feeding CSI (Continued)

information back to the base station based on a measurement result.

5 Claims, 10 Drawing Sheets

(51) Int. Cl.
    *H04B 7/04*      (2017.01)
    *H04B 7/0456*    (2017.01)

(56) References Cited

U.S. PATENT DOCUMENTS

| | | | | |
|---|---|---|---|---|
| 2014/0003240 A1* | 1/2014 | Chen | H04W 28/08 | 370/235 |
| 2014/0079100 A1* | 3/2014 | Kim | H04B 7/0417 | 375/219 |
| 2014/0098689 A1* | 4/2014 | Lee | H04B 7/0469 | 370/252 |
| 2014/0133333 A1* | 5/2014 | Liu | H04W 24/10 | 370/252 |
| 2014/0241274 A1* | 8/2014 | Lee | H04L 5/0048 | 370/329 |
| 2014/0269579 A1* | 9/2014 | Xu | H04W 52/146 | 370/329 |
| 2015/0049625 A1* | 2/2015 | Kim | H04L 1/0026 | 370/252 |
| 2015/0180684 A1* | 6/2015 | Chen | H04B 17/24 | 370/252 |
| 2015/0373736 A1* | 12/2015 | Ji | H04B 7/2621 | 370/330 |
| 2016/0065290 A1* | 3/2016 | Zhu | H04W 52/0209 | 370/329 |
| 2016/0080059 A1* | 3/2016 | Yoon | H04B 7/0417 | 370/329 |
| 2017/0126381 A1* | 5/2017 | Park | H04L 5/0048 | |
| 2017/0359734 A1* | 12/2017 | Lee | H04W 74/0833 | |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 11)," 3GPP TS 36.331 V11.3.0, Mar. 2013, pp. 1-344.

"3rd Generation Partnership Project; Technical Specification Group Radio Access Network; Evolved Universal Terrestrial Radio Access (E-UTRA); Physical layer procedures (Release 11)," 3GPP TS 36.213 V11.2.0, Feb. 2013, pp. 1-173.

"3rd Generation Partnership Project; Technical Specification Group Radio Access Network; Evolved Universal Terrestrial Radio Access (E-UTRA); Physical Channels and Modulation (Release 11)," 3GPP TS 36.211 V11.2.0, Feb. 2013, pp. 1-109.

* cited by examiner

```
-- ASN1START

CSI-Process-r11 ::=          SEQUENCE {
    csi-ProcessId-r11           CSI-ProcessId-r11,
    csi-RS-ConfigNZPId-r11      CSI-RS-ConfigNZPId-r11,
    csi-IM-ConfigId-r11         CSI-IM-ConfigId-r11,
    p-C-AndCBSRList-r11         SEQUENCE (SIZE (1..2)) OF P-C-AndCBSR-r11,
    cqi-ReportBothProc-r11      CQI-ReportBothProc-r11                    OPTIONAL,   -- Need OR
    cqi-ReportPeriodicProcId-r11  INTEGER (0..maxCQI-ProcExt-r11)         OPTIONAL,   -- Need OR
    cqi-ReportAperiodicProc-r11 CQI-ReportAperiodicProc-r11               OPTIONAL,   -- Need OR
    ...
}

P-C-AndCBSR-r11 ::=          SEQUENCE {
    p-C-r11                     INTEGER (-8..15),
    codebookSubsetRestriction-r11  BIT STRING
}

-- ASN1STOP
```

*CSI-Process information elements*

FIG. 3

*CSI-Process information elements*

```
-- ASN1START

CSI-Process-r13              SEQUENCE {
    csi-ProcessId-r13
    csi-RS-ConfigNZPId-Horizonal-r13
    csi-RS-ConfigNZPId-Vertical-r13
    csi-IM-ConfigId-r13
    p-C-AndCBSRList-r13
    cqi-ReportBothProc-r11          CQI-ReportBothProc-r11        OPTIONAL,   -- Need OR
    cqi-ReportPeriodicProcId-r11    INTEGER (0..maxCQI-ProcExt-r11) OPTIONAL, -- Need OR
    cqi-ReportAperiodicProc-r11     CQI-ReportAperiodicProc-r11   OPTIONAL,   -- Need OR
    ...
}

P-C-AndCBSR-r13              SEQUENCE {
    p-C-Horizonal-r13
    p-C-Vertical-r13
    codebookSubsetRestriction-r11   BIT STRING
}

-- ASN1STOP
```

FIG. 7

CSI-Process information elements

```
-- ASN1START

CSI-Process-r11 ::=    SEQUENCE {
    csi-ProcessId-r11               CSI-ProcessId-r11,
    csi-RS-ConfigNZPId-Vertical-r11 CSI-RS-ConfigNZPId-r11,
    csi-IM-ConfigId-r11             CSI-IM-ConfigId-r11,
    p-C-AndCBSRList-r11             SEQUENCE (SIZE (1..2)) OF P-C-AndCBSR-r11,
    cqi-ReportBothProc-r11          CQI-ReportBothProc-r11          OPTIONAL,   -- Need OR
    cqi-ReportPeriodicProcId-r11    INTEGER (0..maxCQI-ProcExt-r11) OPTIONAL,   -- Need OR
    cqi-ReportAperiodicProc-r11     CQI-ReportAperiodicProc-r11     OPTIONAL,   -- Need OR
    ...
}

P-C-AndCBSR-r11 ::=    SEQUENCE {
    p-C-vertical-r11                INTEGER (-8..15),
    codebookSubsetRestriction-r11   BIT STRING
}

-- ASN1STOP
```

FIG. 9

```
CSI-Process-r13        ::=    SEQUENCE {
    csi-ProcessId-r13
    csi-RS-ConfigNZPId-Vertical-r13
    csi-IM-ConfigId-r13
    p-C-AndCBSR-r13
    ...
} p-C-AndCBSR-r13        ::=    SEQUENCE {
    p-C-Horizonal-r13
    p-C-Vertical-r13
    codebookSubsetRestriction-r11    BIT STRING
}
```

FIG. 10

METHOD AND BASE STATION FOR CSI PROCESS CONFIGURATION AND METHOD AND USER EQUIPMENT FOR CSI FEEDBACK

TECHNICAL FIELD

The present disclosure relates to wireless communication technology, and more particularly, to a method in a base station for Channel State Information (CSI) process configuration, a method in a user equipment (UE) for CSI feedback and associated base station and UE.

BACKGROUND

Modern wireless mobile communication systems present two notable features: one is broad band and high rate—for example, the bandwidth of the fourth generation wireless mobile communication system may reach 100 MHz, and its downlink rate may be up to 1 Gbps; and the other is mobile interconnection, which has promoted emerging services like mobile Internet-browsing, mobile video-on-demand, and on-line navigation, etc. These two features call for advanced wireless mobile communication technologies, such as ultra high rate wireless transmission, inter-region interference suppression, reliable signal transmission in mobile environments, distributed/centralized signal processing, etc. In the enhanced 4th generation (4G) and the 5th generation (5G) wireless mobile communication systems of the future, various corresponding key technologies have been proposed and discussed to meet the above development requirements, which deserves extensive attention from researchers in the art.

In October of 2007, the International Telecom Union (ITU) has approved the Worldwide Interoperability for Microwave Access (WiMAX) as the fourth 3G system standard. This event, which happened at the end of the 3G era, is in fact a rehearsal of the 4G standard war. Indeed, in order to confront the challenges from the wireless IP technology represented by wireless local area network (WLAN) and WiMAX, the 3GPP organization has set out to prepare for its new system upgrade—standardization of the Long Term Evolution (LTE) system. As a quasi-4G system which is based on Orthogonal Frequency Division Multiplexing (OFDM), the LTE system had its first release published in 2009, and was subsequently put into commercial use in 2010. Meanwhile, the standardization of the 4G wireless mobile communication system was also started by 3GPP in the first half of 2008, and this system was referred to as Long Term Evolution Advanced (LTE-A). The critical standard specification for physical layer procedures of that system was completed in early 2011. In November of 2011, the ITU officially announced in Chongqing, China that the LTE-A system and the WiMAX system are two official standards for 4G systems. Nowadays, global commercialization of the LTE-A system is progressing step by step.

Although the 4G wireless mobile communication systems, represented by the LTE-A system and the WiMAX system, are able to provide users with communication services at higher rates and enhance users' experience with the services, they are still not capable of sufficiently meeting user demands in the next few years or decade. Currently, mobile communication systems serve approximately 5.5 billion users, and it is estimated that this number will rise up to 7.3 billion in 2015. This involves a significant increase in the number of smartphone users—in 2011 there were about 0.428 billion smartphones in the world, while in 2015 this number will be doubled to about 1 billion. The popularization of powerful smartphones has promoted a rapid increase in wireless mobile communication rate. In recent years, the wireless communication rate steadily increases at a rate of 100% every year in the worldwide range. At this increasing rate, in 10 years from now, the rate of wireless mobile communication systems will have to be increased by 1000 times as compared with that of current systems to accommodate users' basic requirements for communication rate. In general, the rate mentioned above mainly refers to that of data services, which account for approximately 90% of the total traffic and include for example downloading of smartphone applications, real-time navigation, cloud based synchronization and sharing of personal information, etc. The traffic of voice services, in comparison, is not likely to increase dramatically in the next decade due to relatively slow population growth.

In addition to the challenge of increasing the wireless communication rate by 1000 times, another challenge arises from the burgeoning of mobile Internet. Currently, 70 percent of Internet accesses are initiated from mobile terminals. The next decade would be a new opportunity period for the IT industry and the major opportunity lies in that the conventional PC Internet would be gradually replaced by the mobile Internet. Then, new user habits would hasten the emergence of new service modes, such as software developing for handheld communication devices and touch screens, social network based on individual locating, individual oriented cloud based information management, etc. The mobile Internet impacts the wireless mobile communication systems mainly in two aspects. First, mobile video data traffic will increase significantly which is expected to occupy about 66% of the overall data traffic by 2016. Due to their relatively high level of real-time property, such services as mobile video raise a higher reliability requirement for the wireless mobile communication systems. Second, in the future, most mobile data communications will occur indoors or in hotspot cells, which will also bring challenge to the coverage of the wireless mobile communication system.

Moreover, in 2020, there will be 20 billion machine-to-machine communication devices in the world, and their data traffic will increase to 500% of the current level. How to design systems to support numerous machine-to-machine communication devices is also a topic that needs to be explored in depth.

According to the challenges of the next decade, requirements for the development of the enhanced 4G wireless mobile communication system are generally as follows:

Pursuing for higher wireless broadband rate, with focus placed on optimization of local hotspot cells;
Further improving user experience, with communication services on cell edges particularly optimized;
Continuing researches on new technologies that can improve spectrum utilization efficiency, considering that it is impossible for the available spectrum to be expanded by 1000 times;
Having to put into use higher frequency bands (5 GHz or higher) to obtain broader communication bandwidth;
Coordinating existing networks (2G/3G/4G, WLAN, WiMAX, etc.) to share the burden of data traffic;
Optimizations specific to different services and applications;
Strengthening systems' abilities to support massive machine-to-machine communications;
Flexible, intelligent and low cost network planning and deploying;

Devising schemes to save power consumption of networks and battery consumption of user equipments.

To meet the above requirements, in June of this year, a special working conference was held by 3GPP in Slovenia to discuss key technologies of the enhanced 4G wireless mobile communication system. In this conference, a total of 42 proposals were published and discussed, and three major key technologies were finally adopted: Enhanced Small Cell, 3D (three dimensional) MIMO (multiple in multiple out) and Enhanced Coordinated Multi-Point communication.

The 3D MIMO technique is a new approach for improving spectrum utilization. Conventional transmitting and receiving antennas are typically arranged in a horizontal linear array and thus can only identify horizontal angles to generate horizontal beams for multi-user MIMO operations. Since the future communication systems will be widely applied in dense urban areas with many high-rise buildings, transmitting and receiving antennas can be deployed in a mesh array to generate horizontal and vertical beams simultaneously, such that UEs on different floors of a building can communicate with a base station concurrently. There are mainly two research topics for the 3D MIMO technique. One relates to modeling of 3D channels, which involves researches on theoretical models and fitting them to actual experimental results. This is a key preparation step for the research on the 3D MIMO technique. The current researches on channel modeling mainly focus on 2D channels, i.e., the horizontal direction only, mainly for the purpose of simplifying theories and supporting the existing MIMO techniques. The other one relates to 3D beamforming, which involves researches on design of reference signals, codebook for 3D precoding, low-cost feedback of CSI, 3D multi-user MIMO transmission schemes, and the like. In the step of channel modeling as mentioned above, due to the objective presence of 3D channels, there is no need to consider a mesh antenna array. However, in the research on the 3D beamforming, key features of the channel matrix generated by the mesh antenna array needs to be fully considered for specific design.

The present disclosure focuses on the 3D MIMO technique described above, and particularly to coexistence of a new 3D MIMO system and the existing 2D MIMO system.

In an existing 2D MIMO system, Reference 1 (3GPP TS 36.211 V11.2.0 (2013-02)) discloses in section 6.10.5 a design of reference signals, as shown in FIG. 1, where CSI-RS denotes a reference signal for CSI, CRS denotes a cell common reference signal, DM-RS denotes a demodulation reference signal, PDSCH denotes a data region and AP denotes an antenna port.

Further, in an existing 2D MIMO system, Reference 2 (3GPP TS 36.213 V11.2.0 (2013-02)) specifies in section 7.2.4 that a dual-codeword codebook design is used for a 1D cross-polarized linear antenna array as shown in FIG. 2. As an example, Table 1 and Table 2 below list precoding codebooks used for MIMO channels having ranks 1 and 2, respectively. In the tables, $i_1$ and $i_2$ are indices for dual codewords W1 and W2, respectively.

TABLE 1

| $i_1$ | $i_2$ | | | | | | | |
|---|---|---|---|---|---|---|---|---|
| | 0 | 1 | 2 | 3 | 4 | 5 | 6 | 7 |
| 0-15 | $W^{(1)}_{2i_1,0}$ | $W^{(1)}_{2i_1,1}$ | $W^{(1)}_{2i_1,2}$ | $W^{(1)}_{2i_1,3}$ | $W^{(1)}_{2i_1+1,0}$ | $W^{(1)}_{2i_1+1,1}$ | $W^{(1)}_{2i_1+1,2}$ | $W^{(1)}_{2i_1+1,3}$ |
| $i_1$ | 8 | 9 | 10 | 11 | 12 | 13 | 14 | 15 |
| 0-15 | $W^{(1)}_{2i_1+2,0}$ | $W^{(1)}_{2i_1+2,1}$ | $W^{(1)}_{2i_1+2,2}$ | $W^{(1)}_{2i_1+2,3}$ | $W^{(1)}_{2i_1+3,0}$ | $W^{(1)}_{2i_1+3,1}$ | $W^{(1)}_{2i_1+3,2}$ | $W^{(1)}_{2i_1+3,3}$ | where $W^{(1)}_{m,n} = \frac{1}{\sqrt{8}} \begin{bmatrix} v_m \\ \varphi_n v_m \end{bmatrix}$

TABLE 2

| $i_1$ | $i_2$ | | | |
|---|---|---|---|---|
| | 0 | 1 | 2 | 3 |
| 0-15 | $W^{(2)}_{2i_1,2i_1,0}$ | $W^{(2)}_{2i_1,2i_1,1}$ | $W^{(2)}_{2i_1+1,2i_1+1,0}$ | $W^{(2)}_{2i_1+1,2i_1+1,1}$ |
| $i_1$ | 4 | 5 | 6 | 7 |
| 0-15 | $W^{(2)}_{2i_1+2,2i_1+2,0}$ | $W^{(2)}_{2i_1+2,2i_1+2,1}$ | $W^{(2)}_{2i_1+3,2i_1+3,0}$ | $W^{(2)}_{2i_1+3,2i_1+3,1}$ |
| $i_1$ | 8 | 9 | 10 | 11 |
| 0-15 | $W^{(2)}_{2i_1,2i_1+1,0}$ | $W^{(2)}_{2i_1,2i_1+1,1}$ | $W^{(2)}_{2i_1+1,2i_1+2,0}$ | $W^{(2)}_{2i_1+1,2i_1+2,1}$ |
| $i_1$ | 12 | 13 | 14 | 15 |
| 0-15 | $W^{(2)}_{2i_1,2i_1+3,0}$ | $W^{(2)}_{2i_1,2i_1+3,1}$ | $W^{(2)}_{2i_1+1,2i_1+3,0}$ | $W^{(2)}_{2i_1+1,2i_1+3,1}$ | where $W^{(2)}_{m,m',n} = \frac{1}{4} \begin{bmatrix} v_m & v_{m'} \\ \varphi_n v_m & -\varphi_n v_{m'} \end{bmatrix}$ Here, one single Discrete Fourier Transform (DFT) vector is used for characterizing a beamforming direction of a group of antennas having the same polarization component direction and a phase weighting factor vector is used for characterizing how to coherently combine signals from two groups of antennas having different polarization component vectors. The phase weighting factor and the DFT vector can be expressed as:

$\phi_n = e^{j\pi n/2}$ (phase weighting factor)

$v_m = [1 \ e^{j2\pi m/32} \ e^{j4\pi m/32} \ e^{j6\pi m/32}]^T$ (DFT vector).

It can be seen from above that, in fact, Reference 2 proposes a method for constructing a precoding matrix based on two precoders (i.e., the precoder represented by the DFT vector and the precoder represented by the phase weighting factor vector) corresponding to the dual codewords W1 and W2 for a 1D antenna array scenario. Since the 1D antenna array can only identify an azimuth angle but not elevation angle (that is, one spatial dimension is ignored), the solution proposed in Reference 2 can only be applied to certain propagation environments that can be modeled as 2D channel models, but cannot be applied to general propagation environments that are modeled as 3D channel models by standard.

For CSI feedback, there are currently two feedback channels in the LTE and LTE-A systems, namely, a Physical Uplink Control CHannel (PUCCH) and a Physical Uplink Shared CHannel (PUSCH). In general, the PUCCH is configured for transmission of periodic, basic CSI with low payload; while the PUSCH is configured for transmission of bursty, extended CSI with high payload. On the PUCCH, a complete CSI transmission involves various feedback contents which are transmitted in different sub-frames. On the PUSCH, on the other hand, a complete CSI transmission is carried out within one sub-frame. Such design principles are retained in the LTE-A system.

The feedback contents can be divided into three categories: Channel Quality Index (CQI), Precoding Matrix Index (PMI) and Rank Index (RI), all of which are bit quantized feedbacks. The CQI typically corresponds to a transmission format having a packet error rate not more than 0.1.

In the LTE system, the following eight types of MIMO transmission schemes for downlink data are defined:
1) Single antenna transmission, which is used for signal transmission at a single-antenna transmission point (TP). This scheme is a special instance of a MIMO system and can only transmit a single layer of data.
2) Transmission diversity. In a MIMO system, the effects of time and/or frequency diversities can be utilized for transmitting signals, so as to improve the reception quality of the signals. This scheme can only transmit a single layer of data.
3) Open-loop space division multiplexing, which is space division multiplexing that does not require PMI feedback from UE.
4) Closed-loop space division multiplexing, which is space division multiplexing that requires PMI feedback from UE.
5) Multi-user MIMO. Multiple UEs participate in downlink communications of a MIMO system on the same frequency at the same time.
6) Closed-loop single layer precoding, which is enabled by using a MIMO system. Only a single layer of data is transmitted, and PMI feedback from UE is required.
7) Beam forming transmission, which is enabled by using a MIMO system and the beam forming technique. A dedicated reference signal is configured for data demodulation at a UE. Only a single layer of data is transmitted, and PMI feedback from UE is not required.
8) Two-layer beam forming transmission. A UE may or may not be configured to feed back PMI and RI.

In order to support the above MIMO transmission schemes, a variety of CSI feedback modes are defined in the LTE system. Each MIMO transmission scheme corresponds to a number of CSI feedback modes, as detailed in the following.

On the PUCCH, there are four CSI feedback modes applicable, namely, Mode 1-0, Mode 1-1, Mode 2-0 and Mode 2-1. These modes are combinations of four feedback classes, including:
1) Class 1, which relates to a preferred sub-band (SB) location in a Band Part (BP, which is a subset of a set of communication spectrum resources S and has a size dependent on the size of the Set S) and CQI(s) for the SB. The respective overheads are L bits for the SB location, 4 bits for the CQI of a first codeword and 3 bits for the CQI of a possible second codeword. The CQI of the second codeword is differentially coded with respect to the CQI of the first codeword.
2) Class 2, which relates to broadband CQI(s) and a PMI. The respective overheads are 4 bits for the CQI of a first codeword, 3 bits for the CQI of a possible second codeword and 1, 2 or 4 bits for the PMI depending on the antenna configuration at the TP. The CQI of the second codeword is differentially coded with respect to the CQI of the first codeword.
3) Class 3, which relates to an RI. The overhead for the RI is 1 bit for two antennas or 2 bits for four antennas, depending on the antenna configuration at the TP.
4) Class 4, which relates to a broadband CQI. The overhead is constantly 4 bits.

In accordance with the above different classes, the UE correspondingly feeds back different information to the TP.

Mode 1-0 is a combination of Class 3 and Class 4. That is, feedbacks in accordance with Class 3 and Class 4 are carried out at respective periods and/or with respective sub-frame offsets. This means the broadband CQI of the first codeword on the Set S and possibly the RI information are fed back.

Mode 1-1 is a combination of Class 3 and Class 2. That is, feedbacks in accordance with Class 3 and Class 2 are carried out at respective periods and/or with respective sub-frame offsets. This means the broadband PMI on the Set S, the broadband CQIs of the individual codewords and possibly the RI information are fed back.

Mode 2-0 is a combination of Class 3, Class 4 and Class 1. That is, feedbacks in accordance with Class 3, Class 4 and Class 1 are carried out at respective periods and/or with respective sub-frame offsets. This means the broadband CQI of the first codeword on the Set S and possibly the RI information, the preferred SB location in the BP and the CQI on the SB are fed back.

Mode 2-1 is a combination of Class 3, Class 2 and Class 1. That is, feedbacks in accordance with Class 3, Class 2 and Class 1 are carried out at respective periods and/or with respective sub-frame offsets. This means the broadband PMI on the Set S, the broadband CQIs of the individual codewords and possibly the RI information, the preferred SB location in the BP and the CQI on the SB are fed back.

Between the MIMO transmission schemes and the CSI feedback modes, there are correspondence relationships as follows:
MIMO transmission scheme 1): Mode 1-0 and Mode 2-0;
MIMO transmission scheme 2): Mode 1-0 and Mode 2-0;
MIMO transmission scheme 3): Mode 1-0 and Mode 2-0;
MIMO transmission scheme 4): Mode 1-1 and Mode 2-1;
MIMO transmission scheme 5): Mode 1-1 and Mode 2-1;
MIMO transmission scheme 6): Mode 1-1 and Mode 2-1;
MIMO transmission scheme 7): Mode 1-0 and Mode 2-0;
MIMO transmission scheme 8): Mode 1-1 and Mode 2-1, in case the UE feeds back PMI/RI; or
Mode 1-0 and Mode 2-0, in case the UE does not feed back PMI/RI.

In the single TP transmission mode of the LTE-A system, CQI, PMI and RI are also the primary feedback contents. Moreover, in order to keep the feedback modes for a UE consistent with those corresponding to the transmission schemes 4) and 8) and to enable new transmission schemes 9) and 10), which are dynamic MIMO switching (wherein the TP can dynamically adjust the MIMO mode in which the UE operates) and CoMP transmission (wherein multiple TPs communicate in a coordinated manner) respectively, in the LTE-A system emphasis is placed on optimizing Mode 1-1 and Mode 2-1 for a scenario where a TP is equipped with 8 transmission antennas. Specifically, a PMI is determined jointly by two channel precoding matrix indices W1 and W2, with W1 indicating broadband/long-term channel characteristics and W2 indicating SB/short-term channel characteristics. For transmitting W1 and W2 over PUCCH, Mode 1-1 is sub-divided into two sub-modes: Mode 1-1 (sub-mode 1) and Mode 1-1 (sub-mode 2). The original Mode 2-1 is also modified.

In order to support the newly defined feedback modes, several feedback classes are newly defined in the LTE-A system as follows:

1) Class 1 a, which relates to a preferred SB location in a Band Part (BP, which is a subset of a set of communication spectrum resources S and has a size dependent on the size of the Set S) and a CQI on the SB as well as a W2 on another SB. The overhead for the SB location is L bits, and the total overhead for the CQI and the W2 is 8 bits (if RI=1), 9 bits (if 1<RI<5), or 7 bits (if RI>4).
2) Class 2a, which relates to a W1. The overhead for the W1 is 4 bits (if RI<3), 2 bits (if 2<RI<8), or 0 bits (if RI=8).
3) Class 2b, which relates to a broadband W2 and a broadband CQI. The total overhead for the broadband W2 and the broadband CQI is 8 bits (if RI=1), 11 bits (if 1<RI<4), 10 bits (if RI=4), or 7 bits (if RI>4).
4) Class 2c, which relates to a broadband CQI, a W1 and a broadband W2. The total overhead for the broadband CQI, the W1 and the broadband W2 is 8 bits (if RI=1), 11 bits (if 1<RI<4), 9 bits (if RI=4), or 7 bits (if RI>4). It is to be noted that, in order to limit the feedback overhead, the set of values from which the W1 and the broadband W2 can take their values is formed by down-sampling a complete set of all possible values of the W1 and the broadband W2 (namely, the former set of values is a subset of the latter set of values).
5) Class 5, which relates to an RI and a W1. The total overhead for the RI and the W1 is 4 bits (for 8 antennas and 2-layer data multiplexing) or 5 bits (for 8 antennas and 4/8-layer data multiplexing). Also, it is to be noted that, in order to limit the feedback overhead, the set of values from which the W1 can take its value is formed by down-sampling a complete set of all possible values of the W1.
6) Class 6, which relates to an RI and a Precoding Type Indicator (PTI). The overhead for the PTI is 1 bit, indicating the type of precoding. The total overhead for the RI and the PTI is 2 bits (for 8 antennas and 2-layer data multiplexing), 3 bits (for 8 antennas and 4-layer data multiplexing), or 4 bits (for 8 antennas and 8-layer data multiplexing).

Herein, "W1" and "W2" when used alone refer to "SB W1" and "SB W2" respectively, while "broadband W1" and "broadband W2" are referred to by their full names.

The mode-class relationships between Mode 1-1 (sub-mode 1), Mode 1-1 (sub-mode 1) and Mode 2-1 and the original and the above new feedback classes are as follows:
  Mode 1-1 (sub-mode 1) is a combination of Class 5 and Class 2b. That is, feedbacks in accordance with Class 5 and Class 2b are carried out at respective periods and/or with respective sub-frame offsets.
  Mode 1-1 (sub-mode 2) is a combination of Class 3 and Class 2/2c,
    when the MIMO transmission scheme is of type 4) or 8), Mode 1-1 (sub-mode 2) is composed of Class 3 and Class 2. That is, feedbacks in accordance with Class 3 and Class 2 are carried out at respective periods and/or with respective sub-frame offsets.
    when the MIMO transmission scheme is of type 9) or 10), Mode 1-1 (sub-mode 2) is composed of Class 3 and Class 2c. That is, feedbacks in accordance with Class 3 and Class 2c are carried out at respective periods and/or with respective sub-frame offsets.
  the new Mode 2-1 is specific to the MIMO transmission scheme of type 9) or 10), and is a combination of Class 6, Class 2b and Class 2a/1a,
    when the PTI related to Class 6 is 0, the new Mode 2-1 is composed of Class 6, Class 2b and Class 2a. That is, feedbacks in accordance with Class 6, Class 2b and Class 2a are carried out at respective periods and/or with respective sub-frame offsets.
    when the PTI related to Class 6 is 1, the new Mode 2-1 is composed of Class 6, Class 2b and Class 1a. That is, feedbacks in accordance with Class 6, Class 2b and Class 1a are carried out at respective periods and/or with respective sub-frame offsets.

In the up-to-date LTE Release 11 system, the concept of CSI process is adopted, referring to Reference 3 (3GPP TS 36.331 V11.3.0 (2013-03)). A CSI process is defined to be determined by a CSI reference signal resource (CSI-RS-R) and an interference measurement resource (IMR). That is, the signal portion of the CSI process is determined by a measurement for the CSI-RS-R and the interference portion of the CSI process is determined by a measurement for the IMR. ATP may configure multiple CSI processes for a UE, and the RI of a CSI process may be configured to be the same as the RI of another CSI process. Specifically, a CSI process is defined as an RI reference process, and the TP may configure another RI dependent CSI process to inherit the RI of the RI reference process and have it reported so as to facilitate the CoMP transmission. In particular, in the new Mode 2-1, both the RI and the PTI of the RI reference process are inherited by the RI dependent process. In the new Mode 1-1 (sub-mode 1), because the RI and the W1 are reported at the same time, both the RI and the W1 of the RI reference process are inherited by the RI dependent process if the RI reference process and the RI dependent process have their RI and W1 reported at the same time, and only the RI of the RI reference process is inherited by the RI dependent process if the RI reference process and the RI dependent process have their RI and W1 reported at different times. It is to be noted that, in order to ensure that the inheritance is practicable, the feedback mode and the number of antenna ports for the RI dependent process must be the same as those for the RI reference process. The RI inheritance is mainly used to effect joint transmission of TPs. FIG. 3 is a schematic diagram showing configuration of a CSI process, in which a CSI process Information Element (IE) csi-RS-ConfigNZPId-r11 is used to configure a CSI-RS-R index, csi-IM-ConfigId-r11 is used to configure an IMR index, and p-C-r11 is used to configure a ratio of a power density of data to that of CSI-RS.

In the future wireless mobile communication system, the coexistence of the conventional 2D MIMO system and the 3D MIMO system is a topic that is worth investigating. Further, the new mechanism for the 3D MIMO system needs to be compatible with the conventional mechanism for the 2D MIMO system, so as to ensure the seamless connectivity in the wireless mobile communication system. Currently, References 1~3 have proposed solutions for CSI process configuration and CSI feedback for the 2D MIMO system only. The present disclosure provides new solutions for the 3D MIMO system, enabling the 3D MIMO system to coexist and be compatible with the conventional 2D MIMO system.

SUMMARY

It is an object of the present disclosure to provide a method for CSI process configuration, a method for CSI feedback and a base station and a UE for performing the respective methods, enabling coexistence/compatibility between a 3D MIMO system and a 2D MIMO system.

In a first aspect of the present disclosure, a method in a base station for Channel State Information (CSI) process configuration is provided. The method comprises: setting CSI process information for a User Equipment (UE) supporting three dimensional (3D) Multiple Input Multiple Output (MIMO), the CSI process information including at least an index of a CSI Reference Signal Resource (CSI-RS-R) for a vertical direction of a 3D MIMO antenna array; and transmitting the set CSI process information to the UE.

Preferably, only one CSI process is configured for a UE supporting 3D MIMO only. The process information set for the CSI process includes: an index of a CSI-RS-R for a horizontal direction, an index of a CSI-RS-R for a vertical direction, a ratio of a power density for data transmission to that for transmission of a CSI Reference Signal (CSI-RS) associated with a first row of horizontal antenna array, and a ratio of the power density for data transmission to that for transmission of a CSI-RS associated with a first column of vertical antenna array.

Preferably, the index of the CSI-RS-R for the horizontal direction is the same as an index of a CSI-RS-R configured for a UE supporting two dimensional (2D) MIMO.

Preferably, for a UE supporting both 3D MIMO and 2D MIMO, a first CSI process associated with a first row of horizontal antenna array for 2D MIMO and a second assisting CSI process associated with a first column of vertical antenna array for assisting 2D MIMO are configured. The process information set for the first CSI process includes: an index of a CSI-RS-R for a horizontal direction and a ratio of a power density for data transmission to that for transmission of a CSI-RS associated with the first row of horizontal antenna array. The process information set for the second assisting CSI process includes: an index of a CSI-RS-R for a vertical direction and a ratio of the power density for data transmission to that for transmission of a CSI-RS associated with the first column of vertical antenna array.

Preferably, for a UE supporting both 3D MIMO and 2D MIMO, a first CSI process associated with a first row of horizontal antenna array for 2D MIMO and a second assisting CSI process associated with a first column of vertical antenna array for assisting 2D MIMO are configured. The process information set for the first CSI process includes: an index of a CSI-RS-R for a horizontal direction and a ratio of a power density for data transmission to that for transmission of a CSI-RS associated with the first row of horizontal antenna array. The process information set for the second assisting CSI process includes: an index of a CSI-RS-R for a vertical direction, a ratio of the power density for data transmission to that for transmission of a CSI-RS associated with a first column of horizontal antenna array, and a ratio of the power density for data transmission to that for transmission of a CSI-RS associated with the first column of vertical antenna array.

Preferably, time domain subframes associated with the CSI-RS-R for the vertical direction are consistent with time domain subframes associated with the CSI-RS-R for the horizontal direction.

Preferably, for a UE supporting 2D MIMO, the base station has a zero transmission power over the CSI-RS-R corresponding to the index of the CSI-RS-R for the vertical direction.

In a second aspect of the present disclosure, a method in a User Equipment (UE) for Channel State Information (CSI) feedback is provided. The method comprises: receiving CSI process information from a base station, the CSI process information including at least an index of a CSI Reference Signal Resource (CSI-RS-R) for a vertical direction of a three dimensional (3D) Multiple Input Multiple Output (MIMO) antenna array; measuring a CSI Reference Signal (CSI-RS) transmitted from the base station over the CSI-RS-R configured by the base station; and feeding CSI information back to the base station based on a measurement result.

Preferably, the CSI information includes following information for 3D MIMO: a channel Rank Index (RI), W1 and W2 for a horizontal antenna array, W1 and W2 for a vertical antenna array, a Channel Quality Index (CQI) and frequency sub-band information.

Preferably, the CSI information includes CSI information for 2D MIMO and CSI information for assisting 3D MIMO. The CSI information for 2D MIMO includes an RI, W1 and W2 for a horizontal antenna array, a CQI and frequency sub-band information, and the CSI information for assisting 3D MIMO includes an RI, W1 and W2 for a vertical antenna array, a CQI and frequency sub-band information.

Preferably, the RI and/or the frequency sub-band information in the CSI information for 2D MIMO are inherited as the RI and/or the frequency sub-band information in the CSI information for assisting 3D MIMO.

Preferably, the CQI in the CSI information for 2D MIMO is not fed back and the CQI in the CSI information for assisting 3D MIMO is replaced with a CQI for 3D MIMO.

Preferably, the CQI in the CSI information for assisting 3D MIMO is not fed back and the CQI in the CSI information for 2D MIMO is replaced with a CQI for 3D MIMO.

Preferably, the frequency sub-band information in the CSI information for 2D MIMO and the frequency sub-band information in the CSI information for assisting 3D MIMO are selected jointly for feedback.

Preferably, the CQI in the CSI information for 2D MIMO and the CQI in the CSI information for assisting 3D MIMO are coded differentially for feedback.

In a third aspect of the present disclosure, a base station is provided. The base station comprises: a Channel State Information (CSI) process information setting unit configured to set CSI process information for a User Equipment (UE) supporting three dimensional (3D) Multiple Input Multiple Output (MIMO), the CSI process information including at least an index of a CSI Reference Signal Resource (CSI-RS-R) for a vertical direction of a 3D MIMO antenna array; and a CSI process information transmitting unit configured to transmit the set CSI process information to the UE.

In a fourth aspect of the present disclosure, a User Equipment (UE) is provided. The UE comprises: a Channel State Information (CSI) process information receiving unit configured to receive CSI process information from a base station, the CSI process information including at least an index of a CSI Reference Signal Resource (CSI-RS-R) for a vertical direction of a three dimensional (3D) Multiple Input Multiple Output (MIMO) antenna array; a reference signal measuring unit configured to measure a CSI Reference Signal (CSI-RS) transmitted from the base station over the CSI-RS-R configured by the base station; and a CSI information feedback unit configured to feed CSI information back to the base station based on a measurement result.

The solutions according to the present disclosure have at least the following advantageous effects:

Backward compatibility with the conventional 2D MIMO system;
Low additional overhead for CSI-RS; and
Minor modification to the conventional system protocols and ease of implementation.

BRIEF DESCRIPTION OF THE DRAWINGS

The above and other objects, features and advantages of the present disclosure will be more apparent from the following preferred embodiments described with reference to accompanying drawings, in which:

FIG. 3 is a schematic diagram showing CSI process IEs for configuring a CSI process for a conventional 2D MIMO system;

FIG. 7 is a schematic diagram showing CSI process IEs for configuring a CSI process according to a first embodiment of the present disclosure;

FIG. 9 is a schematic diagram showing CSI process IEs for configuring a CSI process according to a second embodiment of the present disclosure;

FIG. 10 is a schematic diagram showing CSI process IEs for configuring a CSI process according to a third embodiment of the present disclosure;

DETAILED DESCRIPTION

In the following, preferred embodiments of the present disclosure will be described in detail with reference to the drawings. In the description, details and functions unnecessary to the present disclosure are omitted so as not to obscure the concept of the disclosure.

Figure 1:
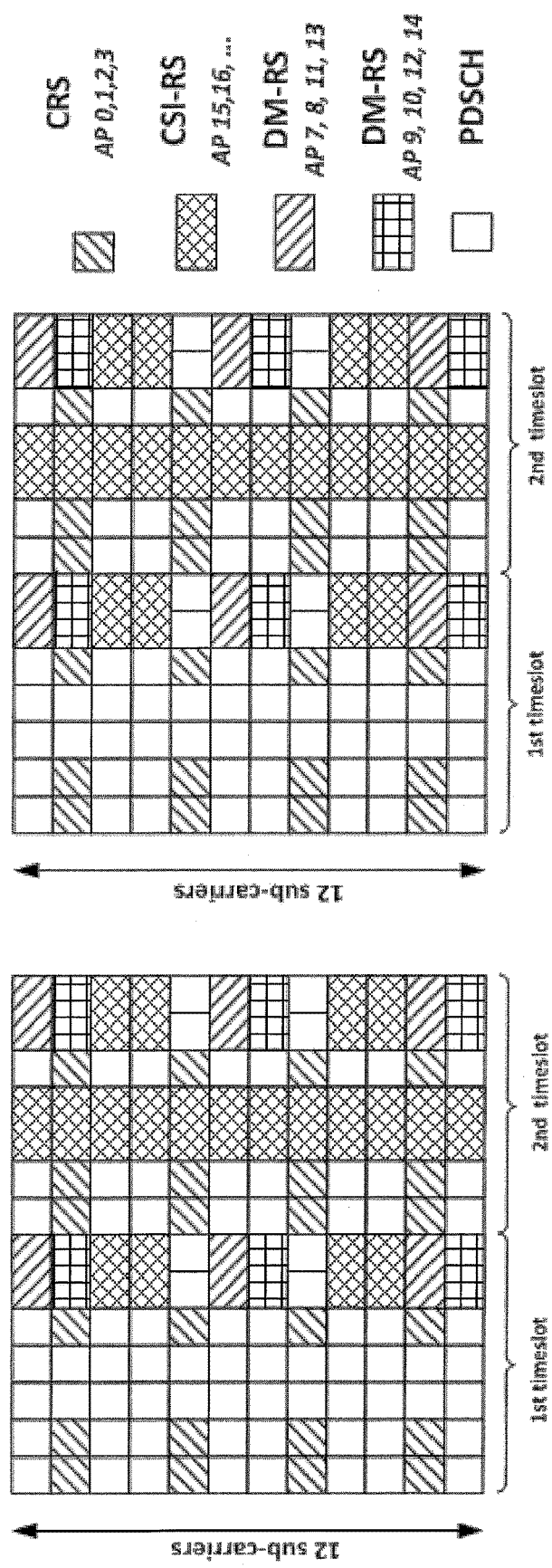
FIG. 1 is a schematic diagram showing a reference signal design in a conventional 2D MIMO system.
Figure 2:
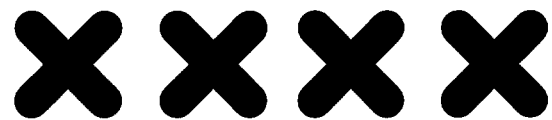
FIG. 2 is a schematic diagram showing a 1D cross-polarized linear antenna array.
Figure 4:
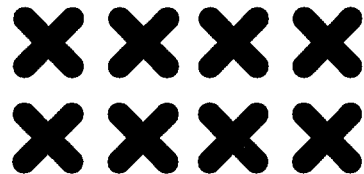
FIG. 4 is a schematic diagram showing a 2D cross-polarized linear antenna array of a 3D MIMO system.

For clear and detailed explanation of the implementation steps of the present disclosure, some specific embodiments applicable to the LTE-Release 12 cellular communication system are given below. It is to be noted that the present disclosure is not limited to the application exemplified in the embodiments. Rather, it is applicable to other communication systems, such as LTE systems after LTE-Release 12/13. Accordingly, terms as used herein may change with the release of the communication system to which the invention is applied. Moreover, the principle and specific examples of the present disclosure will be described in detail below with reference to an arrangement of a 2D cross-polarized linear antenna array shown in FIG. 4. However, it can be appreciated by those skilled in the art that the following examples that are dependent on specific antenna configurations (e.g., the number of antennas, array shape, polarization, and the like) are illustrative only, rather than limitative. For example, it can be appreciated by those skilled in the art that the teaching of the present disclosure can be applied to an antenna array of more antennas, a co-polarized antenna array, or a circular antenna array.

Figure 5:
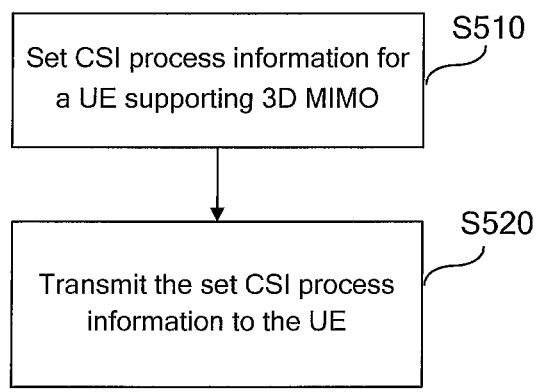
FIG. 5 is a flowchart illustrating a method in a base station for CSI process configuration according to the present disclosure.

First, a method in a base station for CSI process configuration according to the present disclosure will be described with reference to FIG. 5. As shown, the method starts with step S510 where the base station sets CSI process information for a User Equipment (UE) supporting three dimensional (3D) Multiple Input Multiple Output (MIMO). The CSI process information includes at least an index of a CSI Reference Signal Resource (CSI-RS-R) for a vertical direction of a 3D MIMO antenna array. Then, the method proceeds with step S520 where the base station transmits the set CSI process information to the UE.

According to a first embodiment of the present disclosure, FIG. 7 shows IEs for configuring the CSI process for a UE supporting 3D MIMO only. As shown, csi-RS-ConfigNZPId-Horizonal-r13 is used to configure an index of a CSI-RS-R for a horizontal direction and csi-RS-ConfigNZPId-Vertical-r13 is used to configure an index of a CSI-RS-R for a vertical direction. Preferably, the CSI-RS-R corresponding to csi-RS-ConfigNZPId-Horizonal-r13 is a CSI-RS-R for a UE in another 2D MIMO system, such that the system overhead can be reduced. The IE p-C-Horizonal-r13 is used to configure a ratio of a power density for data transmission to that for transmission of a CSI Reference Signal (CSI-RS) associated with a first row of horizontal antenna array, and p-C-Vertical-r13 is used to configure a ratio of the power density for data transmission to that for transmission of a CSI-RS associated with a first column of vertical antenna array.

It is to be noted here that time domain subframes associated with the CSI-RS-R for the vertical direction can be configured to be consistent with time domain subframes associated with the CSI-RS-R for the horizontal direction. As a result, the performance of channel estimation can be improved.

Figure 8:
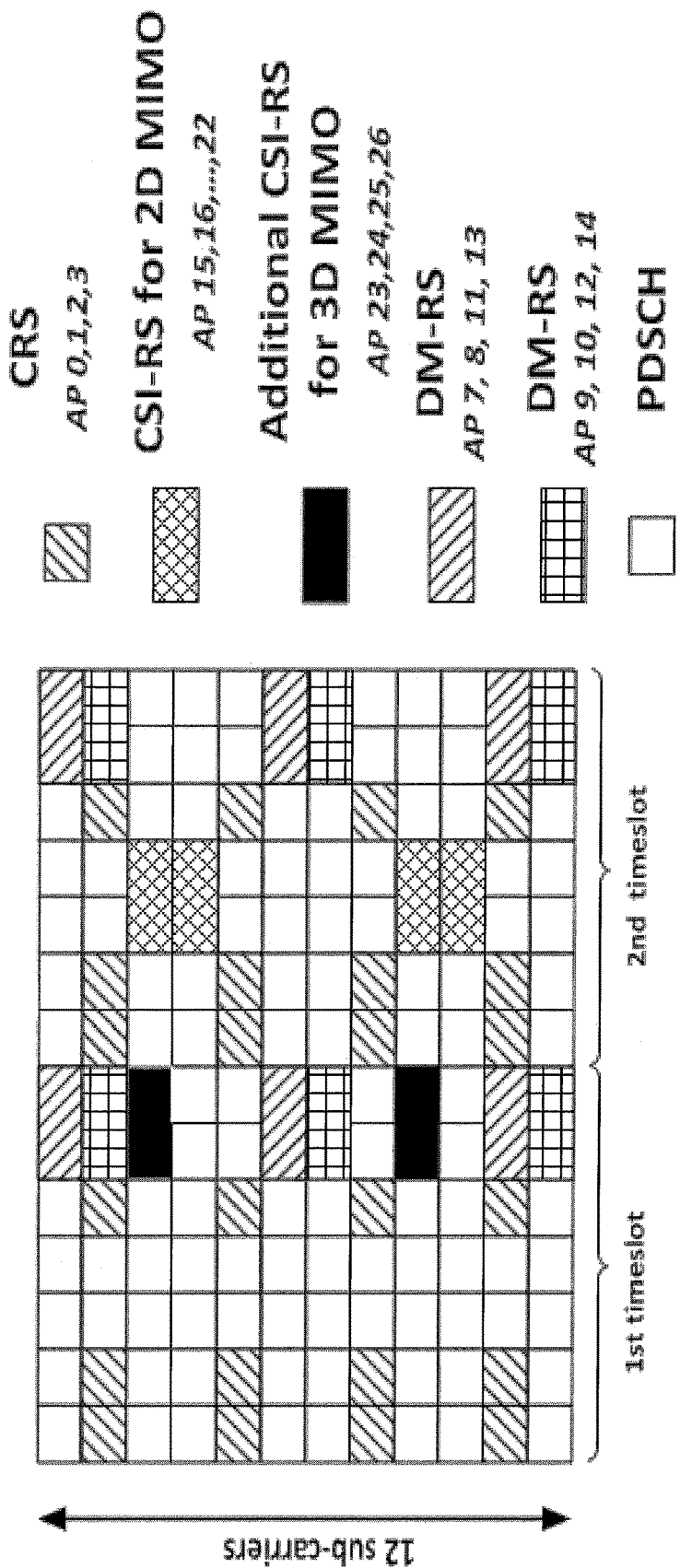
FIG. 8 is a schematic diagram showing a design of a reference signals according to the present disclosure.

Accordingly, FIG. 8 shows a design of reference signals in the case where a 2D MIMO system and a 3D MIMO system coexist. As shown, the resources marked with cross hatching correspond to the CSI-RS-R configured by csi-RS-ConfigNZPId-Horizonal-r13. The resources in black correspond to the CSI-RS-R configured by csi-RS-ConfigNZPId-Vertical-r13, whose presence will affect the data reception and demodulation at a UE of the 2D MIMO system. A simple solution is that, for the UE of the 2D MIMO system, the base station may configure the CSI-RS-R configured by csi-RS-ConfigNZPId-Vertical-r13 (those resources marked with cross hatching) as a CSI-RS-R having zero transmission power. In this way, the UE of the 2D MIMO system will not collect data symbols over those resources. According to a second embodiment of the present disclosure, two CSI processes are configured simultaneously for a UE supporting both the 3D MIMO system and the 2D MIMO system. One of the CSI processes is used for operations of the 2D MIMO system and corresponds to the first row of horizontal antenna array. The IEs for configuring the CSI process are shown in FIG. 3. The other one of the CSI processes is used for assisting operations of the 3D MIMO system and corresponds to the first column of vertical antenna array. The IEs for configuring the CSI process are shown in FIG. 9, which is similar to FIG. 3. In FIG. 9, csi-RS-ConfigNZPId-Vertical-r11 is used to configure an index of a CSI-RS-R for the vertical direction and p-C-Vertical-r11 is used to configure a ratio of the power density for data transmission to that for transmission of a CSI-RS associated with the first column of vertical antenna array.

It is to be noted here that time domain subframes associated with the CSI-RS-R for assisting the 3D MIMO system can be configured to be consistent with time domain subframes for the 2D MIMO system. As a result, the performance of channel estimation can be improved.

Accordingly, FIG. 8 shows a design of reference signals in the case where a 2D MIMO system and a 3D MIMO system coexist. As shown, the resources marked with cross hatching correspond to the CSI-RS-R configured by csi-RS-ConfigNZPId-r11. The resources in black correspond to the CSI-RS-R configured by csi-RS-ConfigNZPId-Vertical-r11, whose presence will affect the data reception and demodulation at a UE of the 2D MIMO system. A simple solution is that, for the UE of the 2D MIMO system, the base station may configure the CSI-RS-R configured by csi-RS-ConfigNZPId-Vertical-r11 (those resources marked with cross hatching) as a CSI-RS-R having zero transmission power. In this way, the UE of the 2D MIMO system will not collect data symbols over those resources.

According to a third embodiment of the present disclosure, two CSI processes are configured simultaneously for a UE supporting both the 3D MIMO system and the 2D MIMO system. One of the CSI processes is used for operations of the 2D MIMO system and corresponds to the first row of horizontal antenna array. The IEs for configuring the CSI process are shown in FIG. 3. The other one of the CSI processes is used for assisting operations of the 3D MIMO system and corresponds to the first column of vertical antenna array. The IEs for configuring the CSI process are shown in FIG. 10, which is similar to FIG. 3. In FIG. 10, p-C-Horizontal-r13 is used to configure a ratio of the power density for data transmission to that for transmission of a CSI-RS associated with the first row of horizontal antenna array and p-C-Vertical-r13 is used to configure a ratio of the power density for data transmission to that for transmission of a CSI-RS associated with the first column of vertical antenna array.

It is to be noted here that time domain subframes associated with the CSI-RS-R for assisting the 3D MIMO system can be configured to be consistent with time domain subframes for the 2D MIMO system. As a result, the performance of channel estimation can be improved.

Accordingly, FIG. 8 shows a design of reference signals in the case where a 2D MIMO system and a 3D MIMO system coexist. As shown, the resources marked with cross hatching correspond to the CSI-RS-R configured by csi-RS-ConfigNZPId-r11. The resources in black correspond to the CSI-RS-R configured by csi-RS-ConfigNZPId-Vertical-r13, whose presence will affect the data reception and demodulation at a UE of the 2D MIMO system. A simple solution is that, for the UE of the 2D MIMO system, the base station may configure the CSI-RS-R configured by csi-RS-ConfigNZPId-Vertical-r13 (those resources marked with cross hatching) as a CSI-RS-R having zero transmission power. In this way, the UE of the 2D MIMO system will not collect data symbols over those resources.

Figure 6:
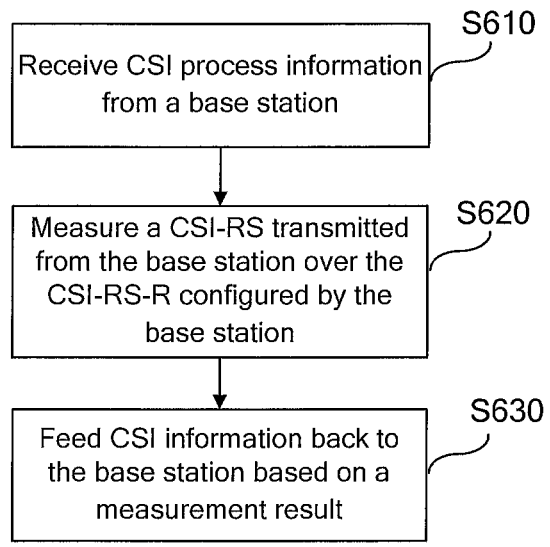
FIG. 6 is a flowchart illustrating a method in a UE for CSI feedback according to the present disclosure.

In the following, a method in a UE for CSI feedback according to the present disclosure, which corresponds to the above method in the base station for CSI process configuration, will be described with reference to FIG. 6. As shown, the method starts with step S610 where the UE receives CSI process information from a base station. The CSI process information includes at least an index of a CSI Reference Signal Resource (CSI-RS-R) for a vertical direction of a three dimensional (3D) Multiple Input Multiple Output (MIMO) antenna array. Then, the method proceeds with step S620 where the UE measures a CSI Reference Signal (CSI-RS) transmitted from the base station over the CSI-RS-R configured by the base station. Finally, the method proceeds with step S620 where the UE feeds CSI information back to the base station based on a measurement result.

According to a first embodiment of the present disclosure, the CSI feedback information shall include: one channel Rank Index (RI) for 3D MIMO, one W1 and one W2 for a horizontal antenna array, one W1 and one W2 for a vertical antenna array, and Channel Quality Index (CQI) and frequency sub-band information for 3D MIMO.

According to a second embodiment of the present disclosure, the CSI feedback information shall include two portions. One is CSI for 2D MIMO, which is the same as in the conventional system, i.e., including one RI for 2D MIMO, one W1, one W2, and CQI and frequency sub-band information for 2D MIMO. The other portion is CSI for assisting 3D MIMO, which is similar to that in the conventional system, i.e., including one RI, one W1, one W2, and CQI and frequency sub-band information. Preferably, the RI in the CSI for assisting 3D MIMO can be obtained by inheriting the RI for 2D MIMO, such that the feedback overhead can be reduced. Preferably, the frequency sub-band information in the CSI for assisting 3D MIMO can be obtained by inheriting the frequency sub-band information for 2D MIMO, such that the feedback overhead can be reduced. Preferably, the CQI for 2D MIMO may not be fed back and the CQI in the CSI information for assisting 3D MIMO can be a CQI for 3D MIMO, such that the feedback overhead can be reduced. Preferably, the CQI in the CSI information for assisting 3D MIMO may not be fed back and the CQI in the CSI information for 2D MIMO can be replaced with a CQI for 3D MIMO, such that the feedback overhead can be reduced. Preferably, the frequency sub-band in the CSI information for 2D MIMO and the frequency sub-band in the CSI information for assisting 3D MIMO can be selected jointly by the UE, such that the feedback overhead can be reduced and the 3D MIMO performance can be improved.

According to a third embodiment of the present disclosure, the CSI feedback information shall include two portions. One is CSI for 2D MIMO, which is the same as in the conventional system, i.e., including one RI for 2D MIMO, one W1, one W2, and CQI and frequency sub-band information for 2D MIMO. The other portion is CSI for assisting 3D MIMO, which adopts a new CSI feedback design and includes W1 and W2 for the first column of vertical antenna array, and CQI and frequency sub-band information for 3D MIMO under an assumption of 2D MIMO. Preferably, the CQI for 2D MIMO and the CQI for assisting 3D MIMO can be coded differentially, such that the feedback overhead can be reduced.

(Hardware Implementation of the Present Disclosure)

Figure 11:
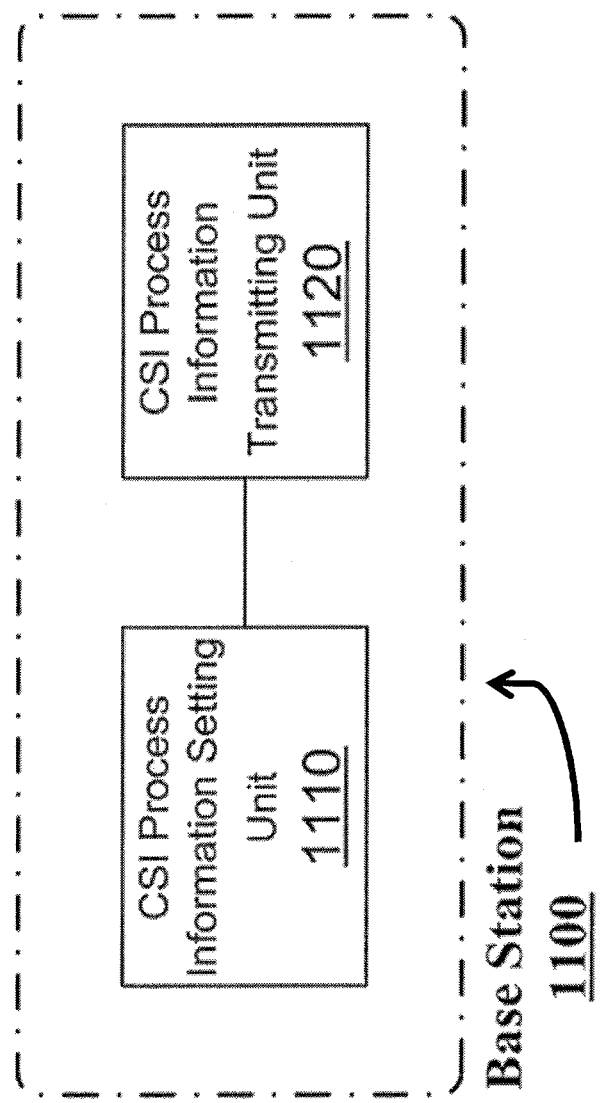
FIG. 11 is a block diagram showing a structure of a base station according to the present disclosure.

In order to implement the above method in hardware, the present disclosure provides a base station 1100. FIG. 11 is a block diagram showing a structure of the base station 1100. As shown, the base station 1100 includes a Channel State Information (CSI) process information setting unit 1110 and a CSI process information transmitting unit 1120. The CSI process information setting unit 1110 is configured to set CSI process information for a User Equipment (UE) supporting three dimensional (3D) Multiple Input Multiple Output (MIMO). The CSI process information includes at least an index of a CSI Reference Signal Resource (CSI-RS-R) for a vertical direction of a 3D MIMO antenna array. The CSI process information transmitting unit 1120 is configured to transmit the set CSI process information to the UE.

Figure 12:
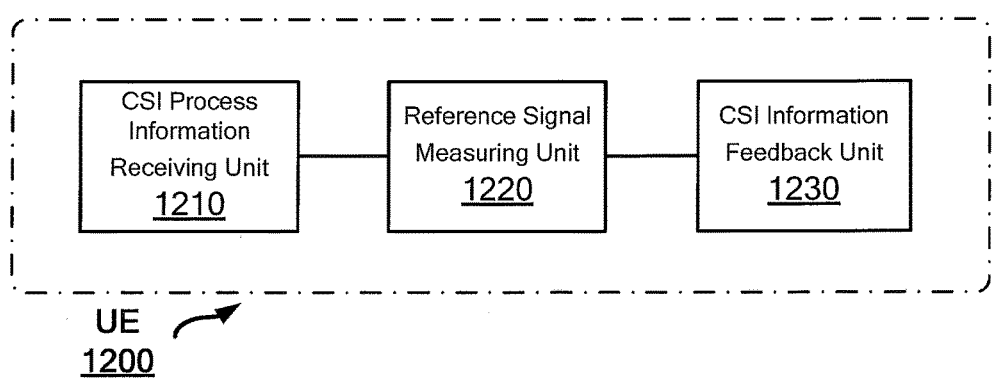
FIG. 12 is a block diagram showing a structure of a UE according to the present disclosure.

Correspondingly, the present disclosure further provides a UE 1200. FIG. 12 is a block diagram showing a structure of the UE 1200. As shown, the UE 1200 includes a Channel State Information (CSI) process information receiving unit 1210, a reference signal measuring unit 1220 and a CSI information feedback unit 1230. The CSI process information receiving unit 1210 is configured to receive CSI process information from a base station. The CSI process information includes at least an index of a CSI Reference Signal Resource (CSI-RS-R) for a vertical direction of a three dimensional (3D) Multiple Input Multiple Output (MIMO) antenna array. The reference signal measuring unit 1220 is configured to measure a CSI Reference Signal (CSI-RS) transmitted from the base station over the CSI-RS-R configured by the base station. The CSI information feedback unit 1230 is configured to feed CSI information back to the base station based on a measurement result.

It should be noted that solutions according to the present disclosure have been described above by a way of example only. However, the present disclosure is not intended to be limited to the above-described steps and element structures. Instead, when appropriate, the steps and elements structures may be adapted or omitted as required. Thus, some of the steps and elements are not essential for embodying the general inventive concept of the present disclosure. Therefore, essential features of the present disclosure are only limited to those required for embodying the general inventive concept of the present disclosure and are not limited by the above specific examples.

In the foregoing, the present disclosure has been described with reference to preferred embodiments thereof. It should be understood that various modifications, alternations and additions can be made by those skilled in the art without departing from the spirits and scope of the present disclosure. Therefore, the scope of the present disclosure is not limited to the above specific embodiments but shall be defined by the claims as attached.

The invention claimed is:

1. A method in a base station for Channel State Information (CSI) process configuration, comprising:
   setting CSI process information for a User Equipment (UE) supporting three dimensional (3D) Multiple Input Multiple Output (MIMO), the CSI process information including at least an index of a CSI Reference Signal Resource (CSI-RS-R) for a vertical direction of a 3D MIMO antenna array; and
   transmitting the set CSI process information to the UE, wherein
   one CSI process is configured for a UE supporting 3D MIMO, and
   the process information set for the CSI process includes: an index of a CSI-RS-R for a horizontal direction, an index of a CSI-RS-R for a vertical direction, a ratio of a power density for data transmission to that for transmission of a CSI Reference Signal (CSI-RS) associated with a first row of horizontal antenna array, and a ratio of the power density for data transmission to that for transmission of a CSI-RS associated with a first column of vertical antenna array.

2. The method of claim 1, wherein the index of the CSI-RS-R for the horizontal direction is the same as an index of a CSI-RS-R configured for a UE supporting two dimensional (2D) MIMO.

3. The method of claim 1, wherein time domain subframes associated with the CSI-RS-R for the vertical direction are consistent with time domain subframes associated with the CSI-RS-R for the horizontal direction.

4. The method of claim 1, wherein, for a UE supporting 2D MIMO, the base station has a zero transmission power over the CSI-RS-R corresponding to the index of the CSI-RS-R for the vertical direction.

5. A method in a User Equipment (UE) for Channel State Information (CSI) feedback, comprising:
   receiving CSI process information from a base station, the CSI process information including at least an index of a CSI Reference Signal Resource (CSI-RS-R) for a vertical direction of a three dimensional (3D) Multiple input Multiple Output (MIMO) antenna array;
   measuring a CSI Reference Signal (CSI-RS) transmitted from the base station over the CSI-RS-R configured by the base station; and
   feeding CSI information back to the base station based on a measurement result, wherein
   the CSI information includes the following information for 3D MIMO: a channel Rank Index (RI), W1 and W2 for a horizontal antenna array, W1 and W2 for a vertical antenna array, a Channel Quality Index (CQI) and frequency sub-band information.

\* \* \* \* \*